(12) United States Patent
Bailey et al.

(10) Patent No.: US 10,909,632 B2
(45) Date of Patent: *Feb. 2, 2021

(54) INTERACTIVE VOICE RESPONSE INTERFACE

(71) Applicant: Hartford Fire Insurance Company, Hartford, CT (US)

(72) Inventors: Sarah Elizabeth Bailey, Eden Prairie, MN (US); Elizabeth Monique Collins-Mashkovich, Unionville, CT (US); Christopher W. Lancaster, Dayton, MN (US)

(73) Assignee: Hartford Fire Insurance Company, Hartford, CT (US)

(*) Notice: Subject to any disclaimer, the term of this patent is extended or adjusted under 35 U.S.C. 154(b) by 96 days.

This patent is subject to a terminal disclaimer.

(21) Appl. No.: 16/173,059

(22) Filed: Oct. 29, 2018

(65) Prior Publication Data

US 2019/0066226 A1 Feb. 28, 2019

Related U.S. Application Data

(63) Continuation of application No. 14/138,784, filed on Dec. 23, 2013, now Pat. No. 10,115,163.

(51) Int. Cl.
   *G06Q 40/08* (2012.01)
   *H04M 3/493* (2006.01)
   *H04M 3/51* (2006.01)
   *H04M 3/42* (2006.01)

(52) U.S. Cl.
   CPC .......... *G06Q 40/08* (2013.01); *H04M 3/4211* (2013.01); *H04M 3/493* (2013.01); *H04M 3/5166* (2013.01)

(58) Field of Classification Search
   CPC .... G06Q 40/08; H04M 3/493; H04M 3/5166; H04M 3/4211
   See application file for complete search history.

(56) References Cited

U.S. PATENT DOCUMENTS

| | | |
|---|---|---|
| 5,825,856 A | 10/1998 | Porter et al. |
| 6,016,336 A | 1/2000 | Hanson |
| 7,848,934 B2 | 12/2010 | Kobylevsky |
| 8,488,774 B2 | 7/2013 | Mahalaha et al. |
| 8,494,152 B1 | 7/2013 | Roberts et al. |
| 8,533,000 B1 | 9/2013 | Pletz et al. |
| 2004/0122941 A1 | 6/2004 | Creamer |
| 2007/0147349 A1 | 6/2007 | Bangor |
| 2008/0240376 A1 | 10/2008 | Conway |
| 2008/0298562 A1 | 12/2008 | Ju |
| 2011/0099116 A1 | 4/2011 | Gabel |
| 2012/0030128 A1 | 2/2012 | Nelson et al. |

(Continued)

*Primary Examiner* — Scott S Trotter
(74) *Attorney, Agent, or Firm* — Howard IP Law Group, PC

(57) ABSTRACT

An interactive voice response interface includes an interactive voice response platform configured for receiving an initial communication including one or more of originating number data, IP address data or device data, accessing caller characteristic data corresponding to an entity based solely on the one or more of originating number data, IP address data or device data, and based on the accessed caller characteristic data and stored logic, determining an initial set of interactive voice response options, the stored logic including associations between of caller characteristic data items and initial option sets for prompting to entities, the caller characteristic data items including prior leave history.

20 Claims, 11 Drawing Sheets

(56) References Cited

U.S. PATENT DOCUMENTS

2012/0082303 A1 4/2012 D'Arcy et al.
2013/0110736 A1 5/2013 Savage et al.
2013/0132122 A1 5/2013 Walsh et al.

Fig. 1B (Prior Art)

From Fig. 1A — Prompt #1

Prompt #5: If you are calling regarding a Leave of Absence, press 4.

Prompt #6: If you are calling to report a new Short Term disability, press 5.

Prompt #7: All other callers, please stay on the line to speak with the next available representative.

Prompt #5.1: If your call is concerning a leave of absense to care for a family member or concerning your own intermittent leave, press 1

Prompt #5.2: If you are calling concerning a new leave of absense for your own serious health condition or to report a new short term disability claim, press 2.

Prompt #5.3: To reach the Leave Management department to report any other leave of absense, press 3.

You may also visit us online at www.thehartford.com to file your claim online. This website is available 24 hours a day, 7 days a week.

You have selected the option to file a new claim with the Hartford. To help expedite this process, please have the following information ready: Your employer's name, your Hartford policy number and your physician's name, phone & fax numbers. If you are ready to proceed, please hold for the next available nurse. <silent pause 2 seconds> For quality and training purpose your calll will be recorded and may be monitored.

Prompt #6.1: If you are calling regarding a maternity claim press 1.

Prompt #6.2: For other claims, press 2.

To Fig. 1A 150

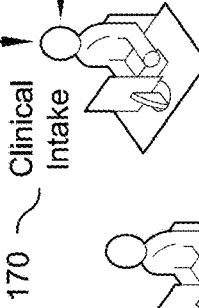
170 — Clinical Intake

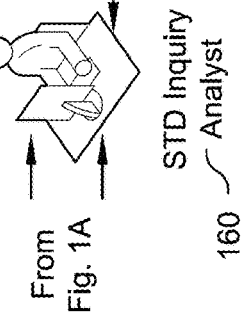
From Fig. 1A
160 — STD Inquiry Analyst

To Fig. 1A 140

INTERACTIVE VOICE RESPONSE INTERFACE

CROSS REFERENCE TO RELATED APPLICATIONS

The present application is a continuation of U.S. patent application Ser. No. 14/138,784, entitled "System And Method For Improved Insurance Call Routing And Processing", filed Dec. 23, 2013, now U.S. Pat. No. 10,115,163, the contents of which are incorporated herein in their entirety for all purposes.

BACKGROUND

Historically, interactive voice response solutions have used a variety of pre-recorded voice prompts and menus to present information and options to callers, and touch-tone telephone keypad entry to collect caller responses. Modern interactive voice response solutions also enable input and responses to be gathered via spoken words with a variety of voice recognition techniques. Interactive voice response systems can respond with pre-recorded or dynamically generated audio messages to direct users on how to proceed. Specifically, each interactive voice response system includes one or more decision or flow trees specifying a plurality of choices that can be taken when communicating with the interactive voice response system. Such interactive voice response solutions in the insurance industry enable users such a policyholders, claimants and third parties to initiate, retrieve and access information including claim status, medical information, employee benefits, payments, etc.

Generally, these decision trees are very convoluted and may be nested within a variety of other decision or flow trees. Inexperienced callers may be unclear on how to proceed and many times end up cycling through a number of irrelevant interactive voice response menu choices. Such frustration results in poor customer satisfaction and reflects poorly on the administering insurance entity.

Accordingly, it would be desirable to have a system that could provide users with improved and streamlined interactive voice response system experiences especially in the insurance field.

SUMMARY

In one embodiment, the present invention is an interactive voice response processing system for insurance based applications. The system may include one or more data storage devices storing a database having a plurality of selected options for different option sets for prompting to different entities in the interactive voice response processing system. The system may further include an interactive voice response server in communication with the database, the server having at least one processor configured for communication over a network and one or more memories, and an interactive voice response application, stored in the one or more memories, having processor executable instructions, which instructions, when executed by the at least one processor, cause the at least one processor to carry out the following steps: receive an initial communication from an entity; provide an initial set of interactive voice response options to be prompted by the interactive voice response data processing system; receive an option selection from the entity from the initial set of interactive voice response options; and dependent on the received option selection, either provide a subsequent set of interactive voice response options to be prompted by the interactive voice response data processing system, wherein the subsequent interactive voice response options include access to at least one combined short term disability and leave management resource and at least one clinical intake nurse resource, the short term disability and leave management resource and the clinical intake nurse resource in communication with at least one insurance claims based subsystem, or route the entity to one of the at least one combined short term disability and leave management resource and at least one clinical intake nurse resource.

In other embodiments, the invention is an interactive voice response processing method for insurance based applications comprising: receiving via an interactive voice response communication network an insurance inquiry from a subscriber entity; accessing subscriber entity data in a database to determine preliminary characteristics of the entity; providing by, an interactive voice response processor, an initial set of interactive voice response options based on preliminary characteristics of the entity; receiving by, the interactive voice response processor, an option selection from the entity from the initial set of interactive voice response options; and providing by, the interactive voice response processor, a subsequent set of interactive voice response options, wherein the subsequent interactive voice response options include access to at least one combined short term disability and leave management resource and at least one clinical intake nurse resource, the short term disability and leave management resource and the clinical intake nurse resource in communication with at least one insurance claims based subsystem.

In other embodiments, the present invention is a computer program product comprising a computer usable non-transitory storage medium storing computer usable program code for interactive voice response prompting, the computer usable program code, when executed by one or more computer processors, causing the one or more computer processors to perform the steps of: receiving a call in an interactive voice response processing system from a caller; retrieving an initial set of insurance related options to be prompted by the interactive voice response data processing system; providing the initial set of insurance related options to the caller; receiving a selection from the initial set of insurance related options from the caller; and responsive to the received selection, either providing a subsequent set of insurance related option to the caller based on the selection from the initial set of insurance related options, or routing the caller to at least one of a combined short term disability and leave management resource and a clinical intake nurse, the combined short term disability and leave management resource and a clinical intake nurse in communication with one or more insurance claims subsystems.

BRIEF DESCRIPTION OF THE DRAWINGS

A more detailed understanding may be had from the following description, given by way of example in conjunction with the accompanying drawings wherein:

FIGS. 1A and 1B show an exemplary interactive voice response platform of the prior art;

DETAILED DESCRIPTION

Disclosed herein are processor-executable methods, computing systems, and related technologies for the administration and management and of insurance based interactive voice response applications for particular application in the disability and leave management areas. Disability and leave management is a major issue for employers of all sizes. Most companies struggle to manage employee absences and data shows that employers consistently indicate that managing leaves is one of their major challenges for staying competitive and profitable. Disability and leave administration involves many company, state and federal rules, policies and regulations under company disability policies including but not limited to the Federal Family and Medical Leave Act (FMLA), state leave laws, and employer-specific leave policies.

The FMLA entitles eligible employees of covered employers to take unpaid, job-protected leave for specified family and medical reasons with continuation of certain group health insurance coverage. The intersection of the various disability and leave management provisions are extremely complicated. For example, Short-term Disability (STD) and the FMLA may work separately as well as together but are very complicated for the general population to understand.

Integrated absence management programs and Leave Management (LM) programs that can help businesses relieve the burden of administration while reducing costs and return-to-work time and all while improving the employee experience. Employers who integrate such managed absence programs such as short- and long-term disability, workers' compensation, as well as other federal and state job-protected leave programs, e.g., Family Medical Leave Act, have a potential to experience substantial cost savings. Integrated absence management programs can help employers to stay compliant with evolving and complex legislation.

Embodiments of the present invention include an improved and efficient interactive voice response system for the handling and management of disability and leave management issues and inquiries in a more efficient and expedite manner. Embodiments of the present invention provide a simple unified interface, which may be a voice-responsive interface and/or a display interface, to report leave events and disability claims under a wide array of leaves including the Federal FMLA, state leaves and employer-specific leaves. Embodiments of the system provide online access for employees to request a leave or check the status of a leave including Short Term Disability, Long Term Disability, Workers' Compensation and the FMLA, etc.

Figure 1A:
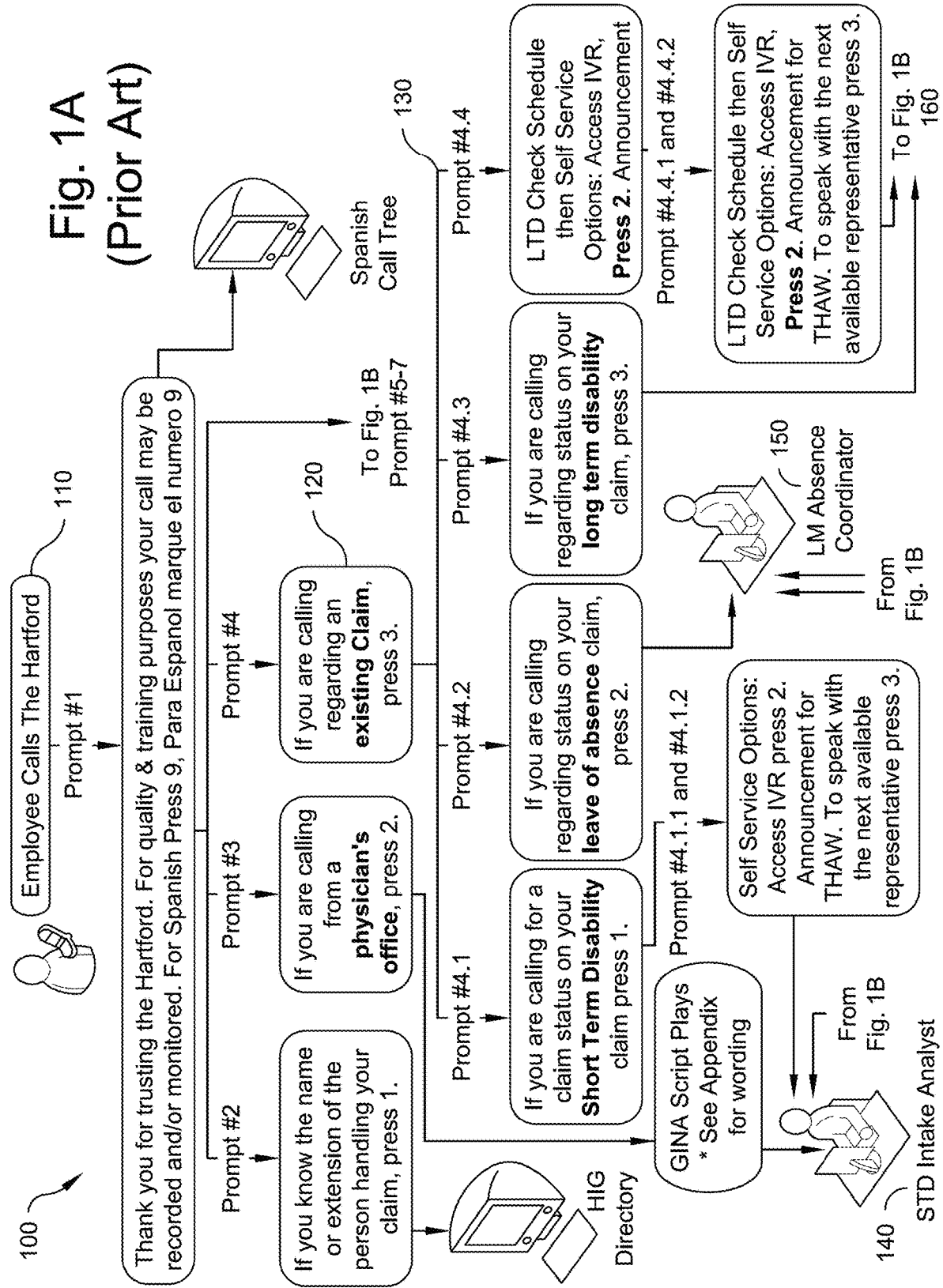

Referring to FIGS. 1A and 1B, there is shown a prior art implementation of an interactive voice response system for application in the disability and leave management fields. Prior art system 100 is a computer-based telephony system that answers calls from callers such as an employee 110 of a certain employer. System 100 generally attempts to route the call to appropriate human agents or other appropriate applications. Generally the system plays a pre-recorded voice prompt 120 to which the caller 110 responds by i) pressing a number on a telephone keypad to select an option, ii) speaking simple answers such as "yes", "no", or appropriate selections numbers, and/or iii) speaking keyword responses to menus to select a certain submenu or call flow 130. In the prior art, these various nested submenus or call flows are extremely complicated and can be confusing for a caller to navigate through. Call flow 130 may lead to various other complicated call flows to eventually route the call to individualized resources such as a short term disability intake analyst 140, a leave management coordinator 150, a short term disability inquiry analyst 160 and a clinical intake resource 170. Prior art interactive voice response system 100 is often criticized as being unhelpful and difficult to use due to poor design, convoluted menu structure and inadequate resource training and consolidation. For example, system 100 may route a caller to one of resources 140, 150, 160, 170, when in fact another one of those resources is better suited to address the caller's inquiry. As a result, callers are many times transferred between resources such as STD intake analyst 140 and LM Absence Coordinator 150 or between LM Absence Coordinator 150 and STD inquiry analyst 160. A properly designed system should connect callers to their desired service promptly and with a minimum of complexity and resolve complexities between STD and LM related inquiries.

Figure 2A:
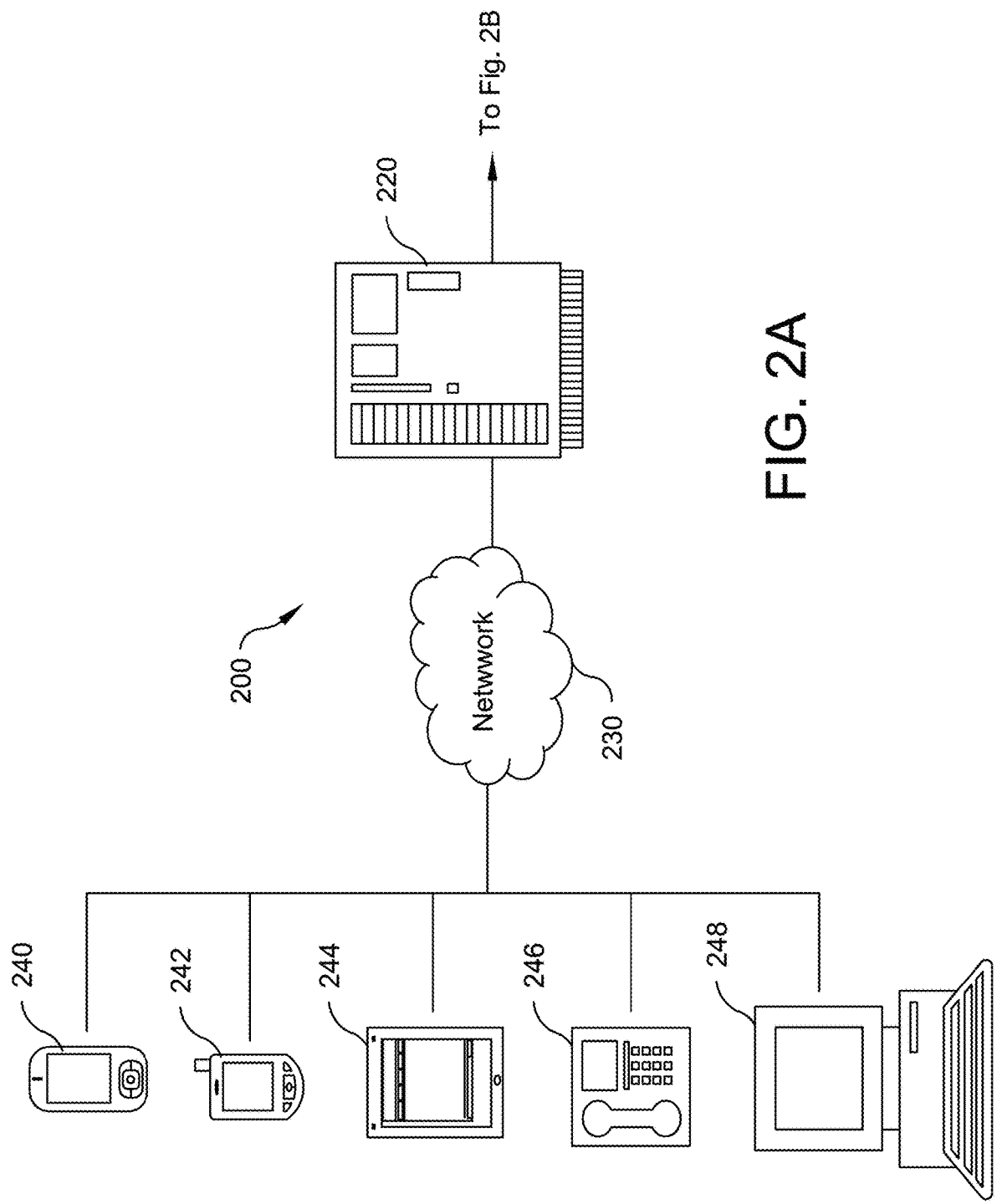
FIGS. 2A and 2B show an exemplary interactive voice response platform of an embodiment of the present invention.
Figure 2B:
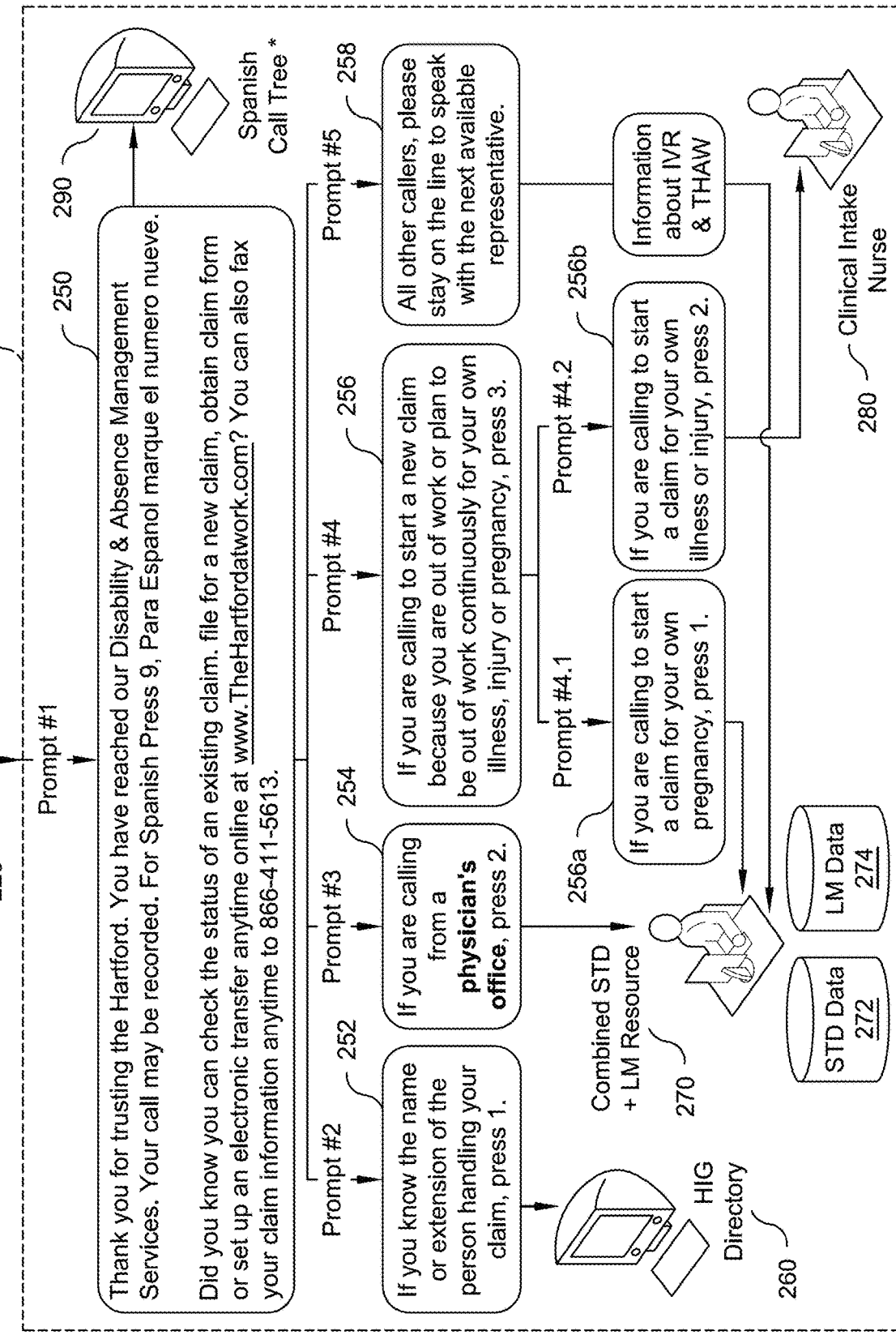

FIGS. 2A and 2B show an improved interactive voice response system 200 in accordance with at least one preferred embodiment of the invention. System 200 incorporates customer friendly language that can lead to easier selection by claimants, a reduction of transferred calls and enhanced set of customer care resources that are now able to support both short term disability and leave management related issues and inquiries. The system 200 includes an interactive voice response platform 210, at least one interactive voice response server 220 and a network 230. The network 230 may represent the Internet, an intranet, a local area or wide area wired and/or wireless network, a cable network, satellite network, as well as combinations or portions of these and other networks such as one or more cloud based networks. Communications between the interactive voice response platform 210 and one or more of the servers 220 may be via communications and connections established over the network 230 in a conventional manner using standard switch based protocols in a public switched telephone network (PSTN), wireless transmission protocols in a cellular telephone network or other type of wireless network, or using Transmission Control Protocol/Internet Protocol (TCP/IP) standard or other suitable communication protocol(s). Servers 220 may represent a computer or group of computers arranged in a conventional manner to process information and data requests and communications over network 230.

Server 220 is communication with one or more user devices 240, 242, 244, 246 and 248 which may be, for example, a wireless device, a laptop, a telephone, a television set-top box, or any other device capable of receiving and/or transmitting audible or electronic information. User devices 240, 242, 244, 246 and 248 are in communication with voice response platform 210 for the handling issues and information related to disability and leave management for one or more employers.

In operation, the system 200 begins operation when a user communication operating one or more of devices 240, 242, 244, 246 and 248 establishes a communication with interactive voice response system 220. Interactive voice response server 220 receives the communication and the user is presented with an initial set of interactive voice response options, also referred to as an initial menu prompt 250, 252, 254, 256, 258. In the illustrated embodiment, the options include one or more alternate language prompts, a known extension prompt 252, and a physician's office prompt 254. None of these are applicable to the general primary language (English in this embodiment) user. The general primary language users are typically employees seeking to start a claim or seeking leave information. For these users, there are two pertinent options in the initial set of interactive voice response options. One of these options is option 256, relating to a new claim for a user who is or expects to be out of work for the caller's own illness, injury or pregnancy. The second of these options is option 258, which is an overflow prompt for all other callers. Thus, the initial set of interactive voice response options includes two options applicable to general primary language users. The interactive voice response system 210 receives a response from the communication device, such as communication device 246 that indicates the selected interactive voice response option or menu selection. The response can be a voice response (e.g. the user saying something in response to the interactive voice response menu) or the response could be where the user enters numbers/pushes buttons on device 246 in response to the interactive voice response menu. For a received selection of prompt 256, the system 210 activates a second set of interactive voice response options such as menu selections 256a, 256b. Menu selections 256a, 256b are configured to provide for different responses for callers seeking to initiate a claim for their own pregnancy, and those seeking to initiate a claim for their own illness or injury. Callers are then connected to an information resource such as resources 260, 270, 280 and 290. In a preferred embodiment, combined STD and LM resource 270 will receive INQ, maternity intake, and stand alone leave inquiries. Clinical intake nurse resource 280 will receive callers seeking to initiate a claim for their own injury or illness (excluding pregnancy) . . . .

Combined STD and LM resource 270 resolves prior art difficulties associated with having multiple resources as shown in FIG. 1 that handle similar issues related to STD and LM inquiries. Providing combined STD and LM resource 270 to process inquiries in the simplified menu structure of system 220 results in a superior customer experience and greater customer satisfaction as users no longer have to navigate complex interactive voice response menu selections and endure being transferred among resources before being matched with a resource appropriate to the customer's particular issue.

Combined STD and LM resource 270 may have training, expertise and access to computer systems to address questions relating to a status of an existing short term disability claim. Computer systems may call up data relating to a claim from a short term disability database 272 by way of example. Data may include data as to confirmation that medical information, such as reports of physicians, have been received, listing of documents required to adjudicate a claim, time remaining to provide required documents, time until adjudication decision, time approved with job protected, remaining time with job protected, timing and amount of payments, and other data. Computer systems may call up data from a leave management database 274 in order to assess an initial claim for another type of leave. Applicable types of leave may include leave under the Federal Family Medical Leave Act (FMLA), Federal military exigency leave, various state-mandated leaves relating to crime victims, volunteer activities, court witness, domestic violence, and other reasons; and leave specific to employer policies. Leave management database 274 may include tables associating states, municipalities and the like, with particular types of leave mandated or available under laws and regulations of the state or municipality. Leave management database 274 may include data indicative of rules for each type of leave, such as length of time a job is protected, applicable waiting periods, limitations on length of leave in a year or other time period, qualification such as tenure prior to eligibility, required documentation such as military orders, subpoenas or other documentation, and other eligibility conditions. In an embodiment, leave management database may include the exemplary data related to state-specific leave set forth in Table 1:

TABLE 1

State-specific leave laws:

| STATE | STATE LEAVE LAWS |
| --- | --- |
| Alabama | Victims of Crime |
| | Civil Air Patrol |
| Alaska | Victims of Crime |
| Arizona | Victim's Leave |
| Arkansas | Bone Marrow or Organ Donors |
| | Crime Victim/Court Witness |
| California | California Family Rights Act |
| | Pregnancy Disability Leave |
| | Parental School Leave |
| | Victims of Domestic Violence Employment Leave Act |
| | Leave for Employees of Military Spouses |
| | Crime Victims' Leave |
| | Time off for Emergency Duties |
| | Civil Air Patrol |
| | Bone Marrow/Organ Donation |
| Colorado | Adoption Leave (Optional based on employer policy) |
| | Leave for Crime Victims |
| | Parental Involvement in K-12 Education Act |
| | Civil Air Patrol Leave of Absence |
| | Qualified Volunteer Leave of Absence |
| | Volunteer Firefighter |
| Connecticut | Family and Medical Leave |
| | Maternity Leave |
| | Crime Victims Leave |
| | Volunteer Firefighter |
| District of Columbia | Family and Medical Leave |
| | School Visitation Leave |
| Delaware | Domestic Violence Provision |
| Florida | Domestic Violence Leave Act |
| | Victims of Crime |
| Georgia | Victims of Crime |
| Hawaii | Family and Medical Leave |
| | Maternity Leave |
| | Domestic or Sexual Violence Leave Rights Leave |
| | Court Witness |
| Illinois | Victims' Economic Security and Safety Act with Domestic and Sexual Violence Victims Leave |
| | School Visitation Leave |
| | Illinois Family Military Leave Act |
| | Blood Donor—820 ILCS 149/10 (Optional based on employer policy) |
| | Volunteer Emergency Worker Job Protection Act |
| Indiana | Military Leave Law |
| | Victim of Crime/Witness |
| | Volunteer Firefighting or Volunteer member activity |
| Iowa | Maternity Leave |
| | Victim of Crime/Court Attendance |
| Kansas | Domestic Violence or Sexual Assault |
| | Pregnancy Leave |
| Kentucky | Adoption Leave |
| | Court Appearance Leave |
| | Volunteer Firefighter/Emergency Worker |
| Louisiana | Maternity Leave |

TABLE 1-continued

State-specific leave laws:

| STATE | STATE LEAVE LAWS |
|---|---|
| | Donation of Bone Marrow Leave |
| | Louisiana School and Daycare Conference and Activities Leave Act |
| Maine | Maine's Family and Medical Leave Act Leave (including Organ Donor Leave) |
| | Leave for Crime Victims |
| | Family Military Leave |
| | Volunteer Firefighter Leave |
| Maryland | Adoption Leave (Optional based on employer policy) |
| | Victim of Crime/Court Witness |
| | Civil Air Patrol Leave |
| Massachusetts | Maternity Leave |
| | Small Necessities Leave Act |
| | Victim of Crime |
| Michigan | Victim of Crime/Court Attendance |
| Minnesota | Parental Leave Act |
| | Adoption Leave (Optional based on employer policy) |
| | School Leave |
| | Donation of Bone Marrow Leave |
| | Crime Victims |
| | Family of Military Personnel |
| | Military Ceremonies |
| | Domestic Abuse Leave Act |
| | Blood Donor Leave |
| | Civil Air Patrol Leave of Absence |
| Mississippi | Victim of Crime/Witness Leave |
| Missouri | Victims of Crime |
| | Emergency Services Leave Law |
| Montana | Maternity Leave |
| | Victims of Crime |
| Nebraska | Adoption Leave (Optional based on employer policy) |
| | Family Military Leave |
| Nevada | School visitation Leave |
| | Pregnancy Leave |
| | Victim of Crime/Court Witness Leave |
| | Parental Involvement - School Conference Leave Law |
| New Hampshire | Victims of Crime |
| | Pregnancy Disability Leave |
| New Jersey | Family Leave |
| | Emergency Responders Employment Protection Act |
| New Mexico | Domestic Violence Leave |
| New York | Adoption Leave (Optional based on employer policy) |
| | Bone Marrow Donation Leave |
| | Family Military Leave |
| | Victims of Crime/Crime Witness Leave |
| | Blood Donation |
| North Carolina | School Involvement Leave |
| | Domestic Violence/Criminal Witness/Victim Leave Law |
| North Dakota | Victims of Crime/Court Witness |
| Ohio | Pregnancy Disability Leave |
| | Criminal/Juvenile Court Leave |
| | Family Military Leave |
| Oregon | Family and Medical Leave including Pregnancy Disability |
| | Crime Victims Leave |
| | Domestic Violence and Sexual Assault Victim Leave |
| | Bone Marrow Leave |
| | Military Family Leave |
| Pennsylvania | Pregnancy, Childbirth, and Childrearing Leave (Optional based on employer policy) |
| | Victims of Crime/Witness Leave |
| | Volunteer Firefighters |
| Puerto Rico | Maternity Leave |
| Rhode Island | Parental and Family Medical Leave |
| | School Involvement Leave |
| | Crime Victims Leave |
| | Rhode Island Military Family Relief Act |
| South Carolina | Donation of Bone Marrow Leave |
| | Pregnancy Disability Law |
| | Victims of Crime/Court Witness Leave |
| | Volunteer Firefighter/Emergency Worker |
| South Dakota | Pregnancy Disability Leave |
| Tennessee | Maternity & Adoption Leave |
| | TN Vol. Firefighter Leave |
| Texas | Crime Victim/Court Witness Leave |
| Utah | Victims of Crime |
| U.S. Virgin Islands | Victims of Crime |
| Vermont | Parental and Family Leave |
| | Short-Term Family Leave |
| | Victims of Crime/Witness Leave |
| Virginia | Crime Victims Leave |
| | Court Attendance |
| Washington | Family Leave Act |
| | Pregnancy/Childbirth Leave |
| | Domestic Violence Leave |
| | Volunteer Firefighter/Emergency Worker |
| | Family Military Leave |
| West Virginia | Volunteer Firefighter/Emergency |
| Wisconsin | Family and Medical Leave |
| | Victim of Crime/Witness Leave Law |
| | Civil Air Patrol Duties |
| | Volunteer Job Protection Act |
| Wyoming | Victims of Crime/Witness Leave |

For each type of leave listed in Table 1, data stored in leave management database 274 may include data indicative of applicable rules. Stored data may include text for prompting a combined LTD and LM resource to input data specific to each type of leave. For the leave types in Table 1 with the notation "Optional based on employer policy," the data stored in leave management database 274 may include a flag or other indication associated with each employer having employees in that state whether the employer's policy provides that type of leave.

Combined LTD and LM resource may have facilities and expertise to provide updates and determinations regarding intermittent leaves. Intermittent leaves are those that do not require the employee to be continuously absent from work for a period of time. For example, an employee may have a physician-mandated maximum number of hours a week of working, such as 20 hours, which would be a type of intermittent leave. Another type of intermittent leave would be leave applicable for a period of time, such as three hours two days each week, for physical therapy for recovery from an injury.

A combined LTD and LM resource may also have access to data regarding light duty or other accommodations for an employee injured so as not to be able to perform his or her regular duties in full, but able to perform a portion of those duties. For example, an injured warehouse worker may be permitted to perform tasks that involve lifting up to 10 pound weights, but not up to 40 pound weights in accordance with the worker's customary job duties. The combined LTD and LM resource may have information as to the duration of light duty, requirements for physician examination and certification before completion of light duty or for continuation of light duty beyond a date or time limit, and other requirements.

In embodiments, a combined LTD and LM resource may have access to one or more insurance claims based subsystems. An example of such an insurance claims based subsystem is an adjudication system for adjudicating between various disability/leave determinations. An adjudication system applies a plurality of rules, including state-specific rules, employer-specific rules, and other rules, in connection with such adjudications.

Figure 3:
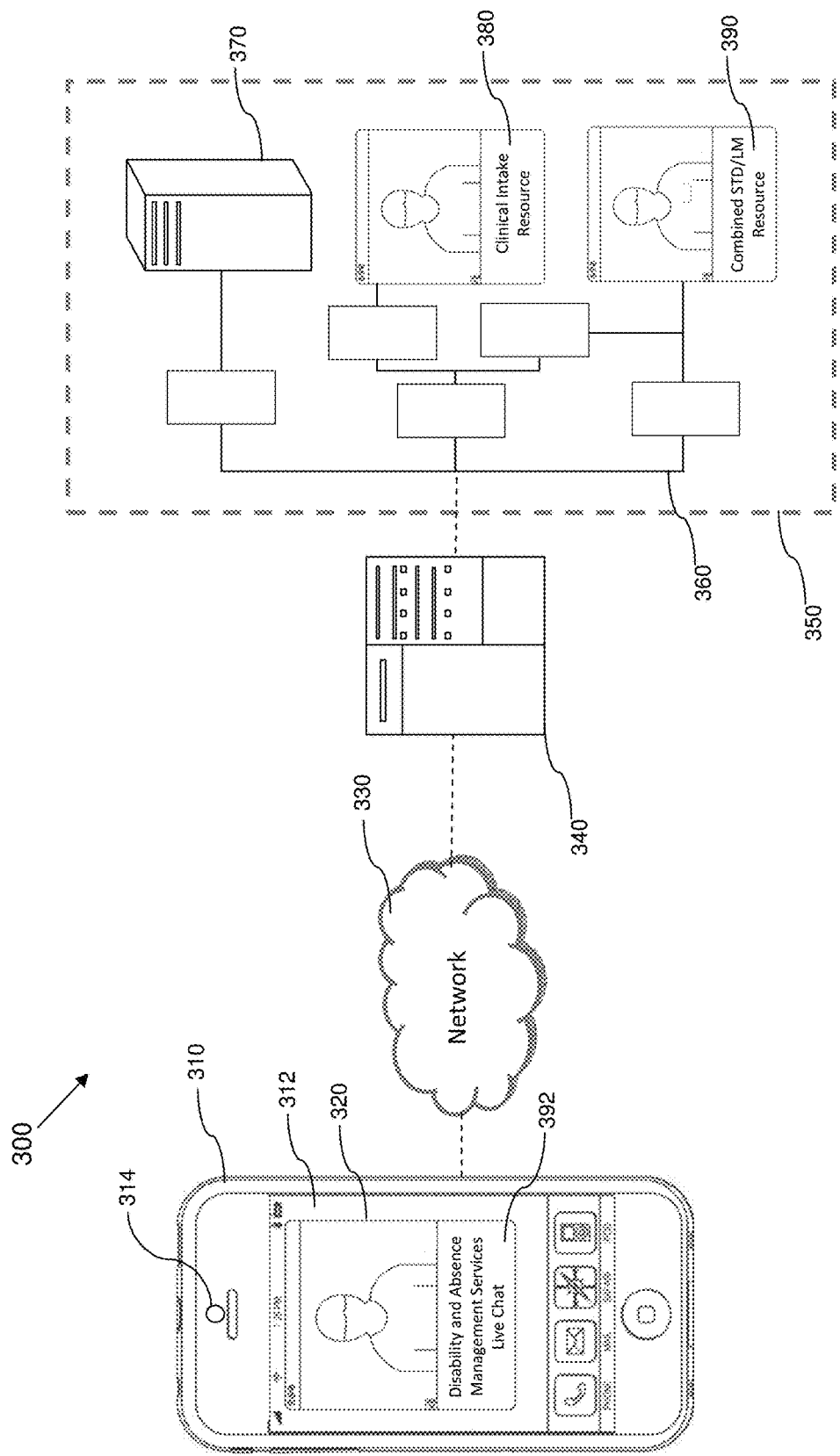
FIG. 3 shows an exemplary interactive voice response system of an embodiment of the present invention.

FIG. 3 shows one embodiment of an interactive voice response system 300 in greater detail. The interactive voice response system 300 includes at least one communication device 310 having a touch screen 312 that may use LCD (liquid crystal display) technology, or LPD (light emitting polymer display) technology, although other display technologies may be used in other embodiments. The touch screen 312 may detect contact and any movement using any of a plurality of touch sensing technologies including but not limited to capacitive, resistive, infrared, and surface acoustic wave technologies, as well as other proximity sensor arrays or other elements for determining one or more points of contact with a touch screen 312. The device 310 may also include one or more optical sensor/imaging module 314. The optical sensor/imaging module 312 may include charge-coupled device (CCD) or complementary metal-oxide semiconductor (CMOS) phototransistors. The optical sensor 314 receives light projected through one or more lens, and converts the light to data representing an image such as a human image. The optical sensor 314 may capture still images or video for use in video chat and video conferencing such as with a clinical intake resource or combined STD/LM resource of the present invention.

Device 310 includes a web browser 320 which is operative to retrieve web pages or other information via a network 330 from one or more of the servers 340. The web browser 320 may be a conventional commercially-available web browser, or a special-purpose browser designed for use with device 310. The browser 320 retrieves text, audio and other information from the server 340 via the network 330. Device 310 is also configured to communicate via network 330 with interactive voice response platform 350 via dual-tone multiple frequency (DTMF) signals. Such signals may be generated on device 310, for example, in response to selections offered in the audio playback or speech supplied from interactive voice response platform 350 to the device 310 for purposes of navigating one or more menu selections 360. Menu selections 360 are coupled to one or more resources including an automated resource 370, a clinical intake resource 380 and a combined STD/LM resource 390. Device 310 is also operative to conduct one or more online chats with, for example, clinical intake resource 380 and combined STD/LM resource 390 via an online chat facility 392 displayed on device 310 to initiate and/or resolve disability and leave management related issues and requests in accordance with the present invention.

Interactive voice response platform 350 may be implemented as a hardware and software platform on which interactive voice response application solutions run to provide the ability to play and record prompts and gather input from users. Interactive voice response platform 350 may also offer the ability to recognize spoken input from callers (voice recognition), translate text into spoken output for callers (text-to-speech or TTS), and transfer interactive voice response calls to appropriate resources such as a combined STD/LM resource 390. Interactive voice response applications are programs that control and respond to calls on the interactive voice response platform. Interactive voice response applications direct the interactive voice response platform to prompt callers, gather input, and transfer callers to other phones as appropriate. Interactive voice response applications also access existing back-end database and application servers to retrieve records and information required during the course of a call such as employee and employer records and information. Back-end database and servers are existing enterprise servers on which the required customer or corporate data can be found. Back-end database and servers can include databases, mainframes, Java or other application servers, and third party information services and solutions. Interactive voice response platform 350 may include certain telephony infrastructure including telephone lines, call switching equipment, and call center Automatic Call Distributors (ACDs). Telephone lines for interactive voice response can be standard analog lines, digital T1, or digital ISDN lines. Such lines are connected to the interactive voice response platform 350 and also to call switching equipment including, for example, telephone company switches, Voice over IP (VoIP) gateways, and corporate PBX's; or in some cases, directly to call centers via an ACD in some embodiments.

Clinical intake resource 380 and combined STD/LM resource 390 may be in communication with one or more insurance claims subsystems. Clinical intake resource 380 may be in communication with a claim initiation subsystem of a short term disability insurance computer system. The claim initiation subsystem may provide prompts for the clinical intake resource to provide medical data, including medical judgment and evaluation data, as well as employee data, to initiate a short term disability claim. The combined STD/LM resource 390 may be in communication with a subsystem of insurance claims systems for management of employee leave, by way of example.

Figure 4:
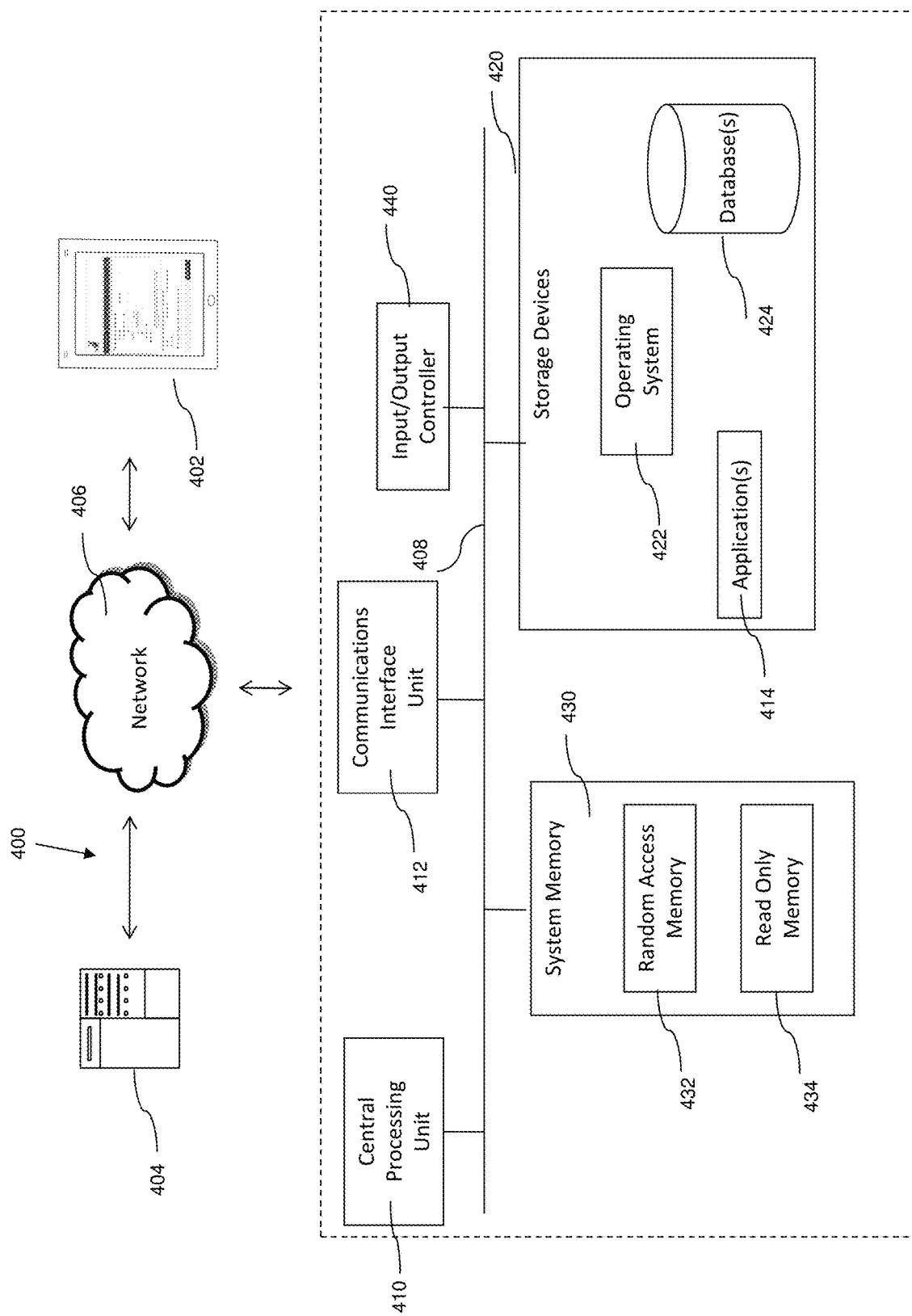
FIG. 4 shows an exemplary system device of an embodiment of the present invention.

Referring to FIG. 4, an exemplary computer system 400 for use in an implementation of the invention will now be described. Computer system 400 may be configured to perform insurance based interactive voice response disability and leave management inquiries for one or more users, clients or customers 402. System 400 may interface with a primary insurance company system 404 via a network 406. In one or more embodiments of the present invention, primary system 404 may be the provider of certain disability and/or leave management services to user 402. In computer system 400, a central processing unit or processor 410 executes instructions contained in programs such as interactive voice response application program 414, stored in one or more data storage devices 420. Processor 410 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 420 may include suitable media, such as optical or magnetic disks, fixed disks with magnetic storage (hard drives), tapes accessed by tape drives, and other storage media. Storage devices 420 may be spread across one or more computer-readable storage media, and may be or include one or more relational databases, hierarchical databases, object-oriented databases, one or more flat files, one or more spreadsheets, and/or one or more structured files. The databases may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Referring still to FIG. 4, processor 410 communicates, such as through bus 408 and/or other data channels, with communications interface unit 412, storage devices 420, system memory 430, and input/output controller 440. System memory 430 may further include a random access memory 432 and a read only memory 434. Random access memory 432 may store instructions in the form of computer code provided by application 414 to implement the present invention. System 400 further includes an input/output controller 440 that may communicate with processor 410 to receive data from user inputs such as pointing devices, touch screens, and audio inputs, and may provide data to outputs, such as data to video drivers for formatting on displays, and data to audio devices.

Storage devices 420 are configured to exchange data with processor 410, and may store programs containing processor-executable instructions, and values of variables for use by such programs. Processor 410 is configured to access data from storage devices 420, which may include connecting to storage devices 420 and obtain data or read data from the storage devices, or place data into the storage devices. Storage devices 420 may include local and network accessible mass storage devices. Storage devices 420 may include media for storing operating system 422 and mass storage devices such as storage 424 for storing data related to insurance information related to employers and employees such as prior leave claims, prior injury claims data and other data.

Communications interface unit 412 may communicate via network 406 with other financial services/insurance company computer systems such as insurance company system servers 404 as well as other servers, computer systems of agents, financial advisors, customers, remote sources of data, and with systems for implementing instructions output by processor 410. Insurance services company server 404 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router.

A variety of communications protocols may be part of the system, including but not limited to: Ethernet, SAP, SAS™, ATP, Bluetooth, GSM and TCP/IP. Network 406 may be or include wired or wireless local area networks and wide area networks, and over communications between networks, including over the Internet. One or more public cloud, private cloud, hybrid cloud and cloud-like networks may also be implemented, for example, to handle and conduct processing of one or more transactions or calculations of embodiments of the present invention. Cloud based computing may be used herein to handle any one or more of the application, storage and connectivity requirements of embodiments of the present invention. Furthermore, any suitable data and communication protocols may be employed to accomplish the teachings of the present invention.

With reference still to FIG. 4, communications interface 412 is used for receiving user data related to the user's disability and leave management issues. Computer processor 410 executes program instructions, such as provided by application 414 to receive, via the communications interface 412, claim history data, medical data, leave data and other related information. Database 424 may include transaction data such as historical data from the user or other third parties.

Figure 5:
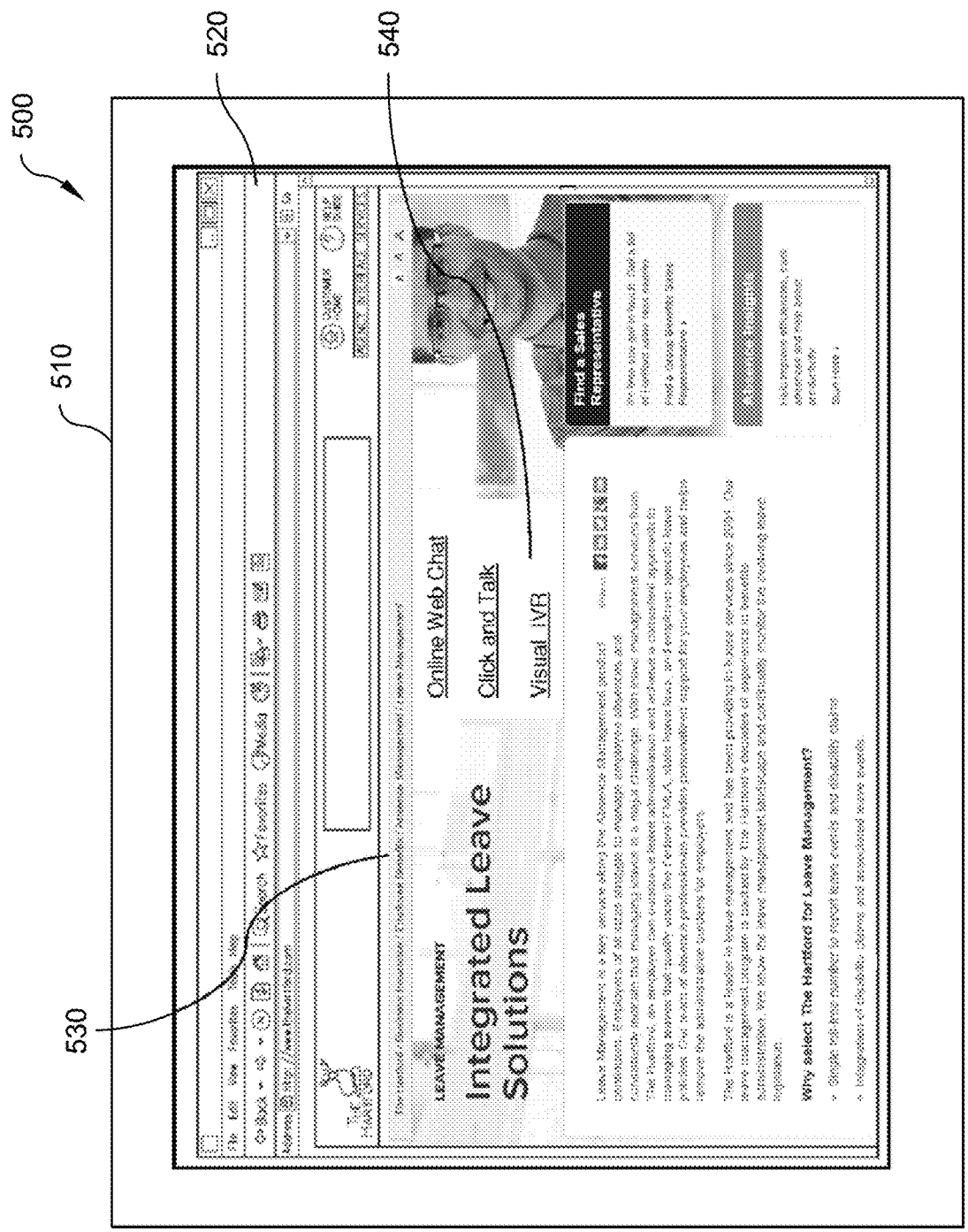
FIG. 5 shows an exemplary system screen of an embodiment of the present invention.

FIG. 5 illustrates an exemplary screen 500 of the present invention as may be displayed among devices shown in FIGS. 1-4. In one embodiment, a user operates a device 510, such as a portable computing device for viewing and accessing information and data related to a disability and leave management issue as described herein. Portable computing device 510 may include a touch screen 520 that can be an active sensor employing capacitive, resistive, inductive, or other methods, or it can be a passive surface on which touch sensing is accomplished by optical, acoustic, or other similar methods. Screen 520 can also be a liquid crystal display (LCD), organic light emitting diode (OLED) display, electroluminescent display, or any other type of small display suitable for mounting in a portable computer or mobile device. Device 510 may be color or monochrome, and may include a backlight capability to enhance readability in various lighting conditions.

In embodiments of the present invention, device 510 displays a web document 530 for access by a user. Web document 530 may include a display area 540 for displaying user selectable options related to an online web chat facility, a click and talk type of facility and a visual IVR type of facility. Each of the online web chat facility, a click and talk type of facility and a visual IVR type of facility options provided in display area 540 may link the user to one or more of a combined disability/leave management resource and a clinical intake resource for discussing one or more disability and leave management issues. Web document 530 may be provided or controlled by an insurance entity for the display of information on one or more insurance services that have been determined to be suitable for the user based on their inputs and selections.

Figure 6:
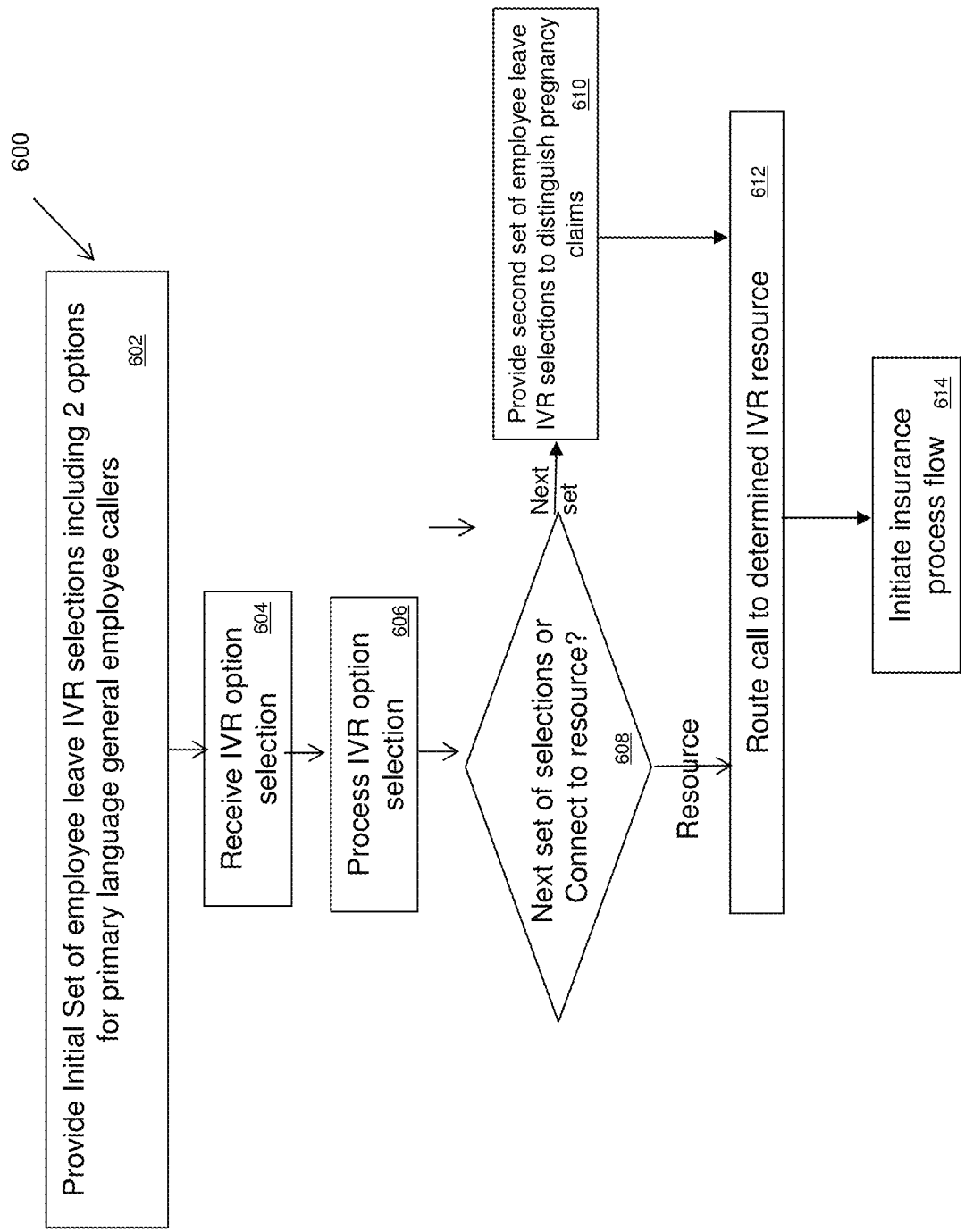
FIG. 6 shows a process flow diagram of an exemplary method of the present invention.

FIG. 6 shows a process flow diagram illustrating a computer implemented method 600 of the present invention. The process begins when a caller dials in or logs into an interactive voice response system of the present invention. In response, an interactive voice response server provides 602 an initial set of interactive voice response options. The initial set of interactive voice response server options includes, in an embodiment, a secondary language option, a known extension selection option, a caller from physician's office selection, and two options for general employee leave-related calls. In other embodiments, one or more of the secondary language option, a known extension selection option, and a caller from physician's office selection are omitted. In other embodiments, three options are provided for the general employee leave caller. By way of example, a separate option may be provided for a caller calling about her own pregnancy. By way of further example, a separate option may be provided for a common type of leave. For example, for employers or geographic areas where FMLA leave requests are common, the initial set of interactive voice response server options may include an option for callers calling to start a new claim because the caller plans to be out of work for a family member's illness or injury.

An interactive voice response selection is received 604 by an interactive voice response platform. The selection may be provided via an interactive voice response menu or other facility. The selection can be a voice response (e.g. the user saying something in response to the interactive voice response menu) or alternatively the response could be where the user enters numbers/pushes real or virtual buttons on their phone device in response to the interactive voice response menu. The interactive voice response system processes the interactive voice response selection 606. The interactive voice response then determines whether the caller is to be assigned to an appropriate interactive voice response resource or to a second set of interactive voice response server options, step 608. The second set of interactive voice response server options may be configured to distinguish one or more circumstances covered by the one of the options for the general employee leave caller, but which may be appropriately assigned to different ones of the resources. By way of example, the second set of interactive voice response server options may be configured to distinguish callers expecting to be out of work due to the caller's own pregnancy, properly referred to a combined STD/LM resource, from callers out of work or expecting to be out of work due to their own illness or injury, properly referred to a clinical intake nurse resource. In other embodiments, an initial set of interactive voice response server options may include those calling because they expect to be out of work due to an illness or injury of themselves or a family member. A second set of interactive voice response server options may distinguish between those expecting to be out of work because of their own illness or injury, properly referred to a clinical intake nurse resource, and those expecting to be out of work because of the illness or injury of a family member, properly referred to a combined STD/LM resource. The second set of interactive voice response server options is provided and processed and an appropriate resource is selected, step 610. The call is then routed to the determined interactive voice response resource, step 612, such as a combined STD/LM resource or a clinical intake resource. An insurance process flow is then initiated, step 614, such as the intaking of a new injury claim by a clinical intake nurse. Other examples of insurance process flow are evaluating a set of circumstances to determine whether a state-specific or employer-specific leave may be available, and determining whether the identified leave is available, or whether additional information or documentation must be supplied by the employee. A further insurance workflow is a workflow relating to an existing short term disability claim, including obtaining identifying information from the caller, accessing short term disability claim records relating to the caller, responding to one or more questions, and informing the caller as to any applicable deadlines, such as deadlines to provide medical documentation or a date of expiration of job protection under short term disability leave.

One or more steps of method 600 may be implemented as computer program instructions provided on a non-transitory computer readable medium for execution by one or more processors. As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Figure 7:
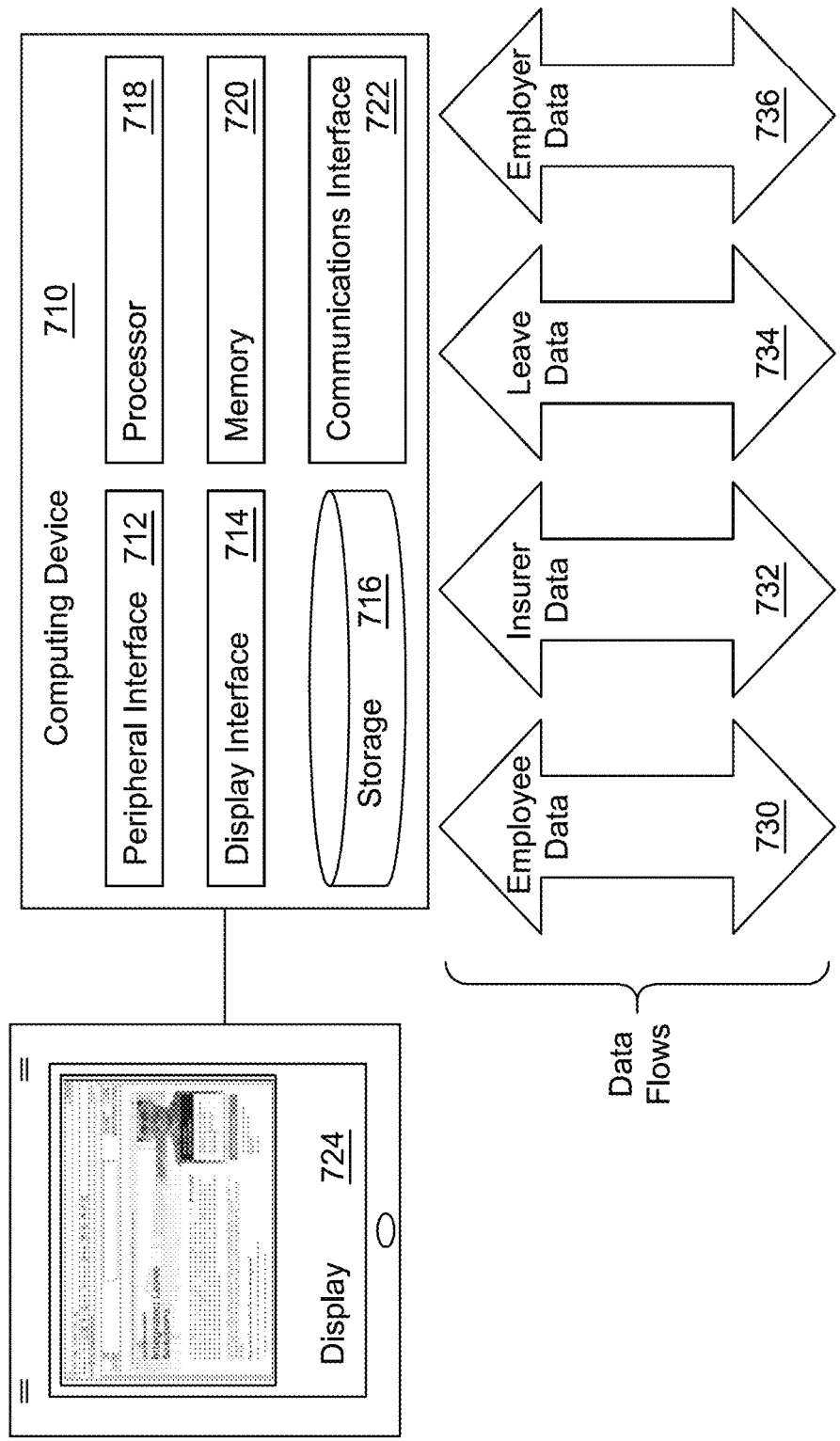
FIG. 7 shows another exemplary device and associated data flows of the present invention.

FIG. 7 shows an example computing device 710 that may be used to implement features describe above. The computing device 710 may include a peripheral device interface 712, display device interface 714, a storage device 716, a processor 718, a memory device 720, and a communication interface 722. Computing device may be coupled to a display device 724, which may be separately coupled to or included within the computing device 710. In operation, computing device 710 is configured to receive and transmit a number of data flows via communications interface 722 including, for example, employee data 730, insurer data 732, leave data 734 and employer data 736.

The peripheral device interface 712 may be an interface configured to communicate with one or more peripheral devices. The peripheral device interface 712 may operate using a technology such as Universal Serial Bus (USB), PS/2, Bluetooth, infrared, serial port, parallel port, and/or other appropriate technology. The peripheral device interface 712 may, for example, receive input data from an input device such as a keyboard, a mouse, a trackball, a touch screen, a touch pad, a stylus pad, and/or other device. Alternatively or additionally, the peripheral device interface 712 may communicate output data to a printer that is attached to the computing device 710 via the peripheral device interface 712.

The display device interface 714 may be an interface configured to communicate data to display device 724. The display device 724 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the display device 724 for display by the display device 724. As shown in FIG. 7, the display device 724 may be external to the computing device 710, and coupled to the computing device 710 via the display device interface 714. Alternatively, the display device 724 may be included in the computing device 700.

The memory device 720 of FIG. 7 may be or include a device such as a Dynamic Random Access Memory (D-RAM), Static RAM (S-RAM), or other RAM or a flash memory. The storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 710 of FIG. 7 may be configured to perform any feature or any combination of features described above as performed by the user device 240, 242, 244, 246 and 248 as described with respect to FIGS. 2A and 2B, user device 310 as described above with respect to FIG. 3, or the device 510 as described with respect to FIG. 5. In such an instance, the memory device 720 and/or the storage device 716 may store instructions which, when executed by the processor 718, cause the processor 718 to perform any feature or any combination of features described above as performed by the web browser 320. Alternatively or additionally, in such an instance, each or any of the features described above as performed by the any of devices 240, 242, 244, 246, 248, 310 or 510 or any of their components may be performed by the processor 718 in conjunction with peripheral device interface 712, display device interface 714, and/or storage device 716, memory device 720, and communication interface 722.

Alternatively or additionally, an instance of the computing device 710 may be configured to perform any feature or any combination of features described above as performed by the interactive voice response platform 210 or 350. In such an instance, the memory device 720 and/or the storage device 716 may store instructions which, when executed by the processor 718, cause the processor 718 to perform any feature or any combination of features described above. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by server 220 or server 340. In such an instance, the memory device 720 and/or the storage device 716 may store instructions which, when executed by the processor 718, cause the processor 718 to perform any feature or any combination of features described above as performed by the client module 142. In such an instance, the processor 718 may perform the feature or combination of features in conjunction with the memory device 720, communication interface 722, peripheral device interface 712, display device interface 714, and/or storage device 716.

Although FIG. 7 shows that the computing device 710 includes a single processor 718, single memory device 720, single communication interface 722, single peripheral device interface 712, single display device interface 714, and single storage device 716, the computing device may include multiples of each or any combination of these components 712, 714, 716, 718, 720, and 722 and may be configured to perform analogous functionality to that described above.

Figure 8:
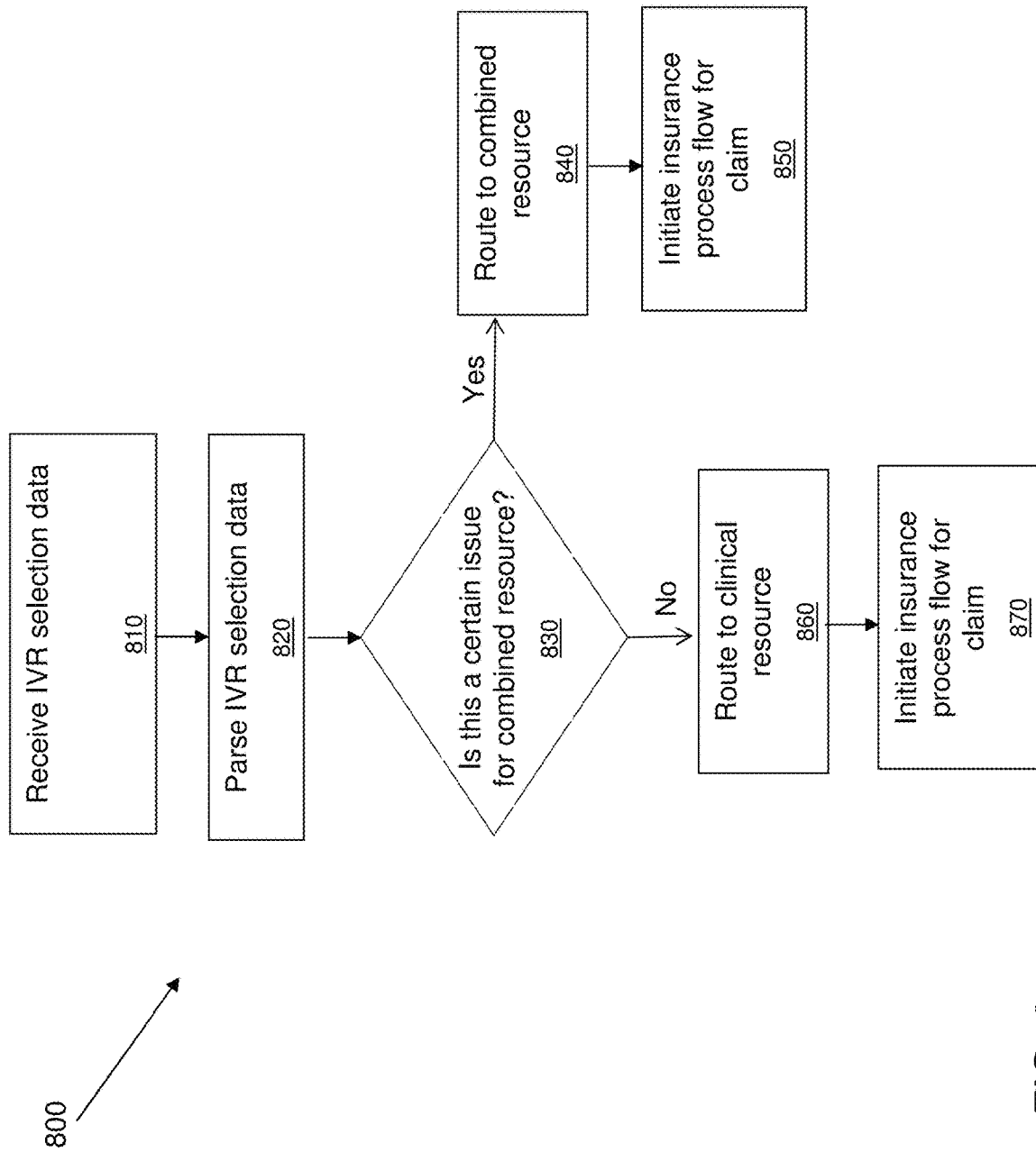
FIG. 8 shows a process flow diagram of another exemplary method of the present invention.

FIG. 8 shows a flow diagram illustrating another computer implemented method 800 of the present invention. Method 800 begins with receiving an IVR selection data from a user or employee, step 810. The IVR selection data is parsed, step 820. It is determined then if the inquiry relates to a certain issue for a combined resource such as a maternity issue, step 830. If so, then the inquiry is routed to a combined resource, step 840 such as a certain STD/LM combined resource. An insurance process flow is then initiated for the claim, step 850. If not, the inquiry is routed to a clinical resource, step 860. A process flow is then initiated for the claim, step 870. In one embodiment, the process flow may include processing through an insurance claims based subsystem such as an adjudication system for adjudicating between various disability/leave determinations. For example, the subsystem may be used to determine if an employee is eligible for short term disability or simply a leave management process.

Figure 9:
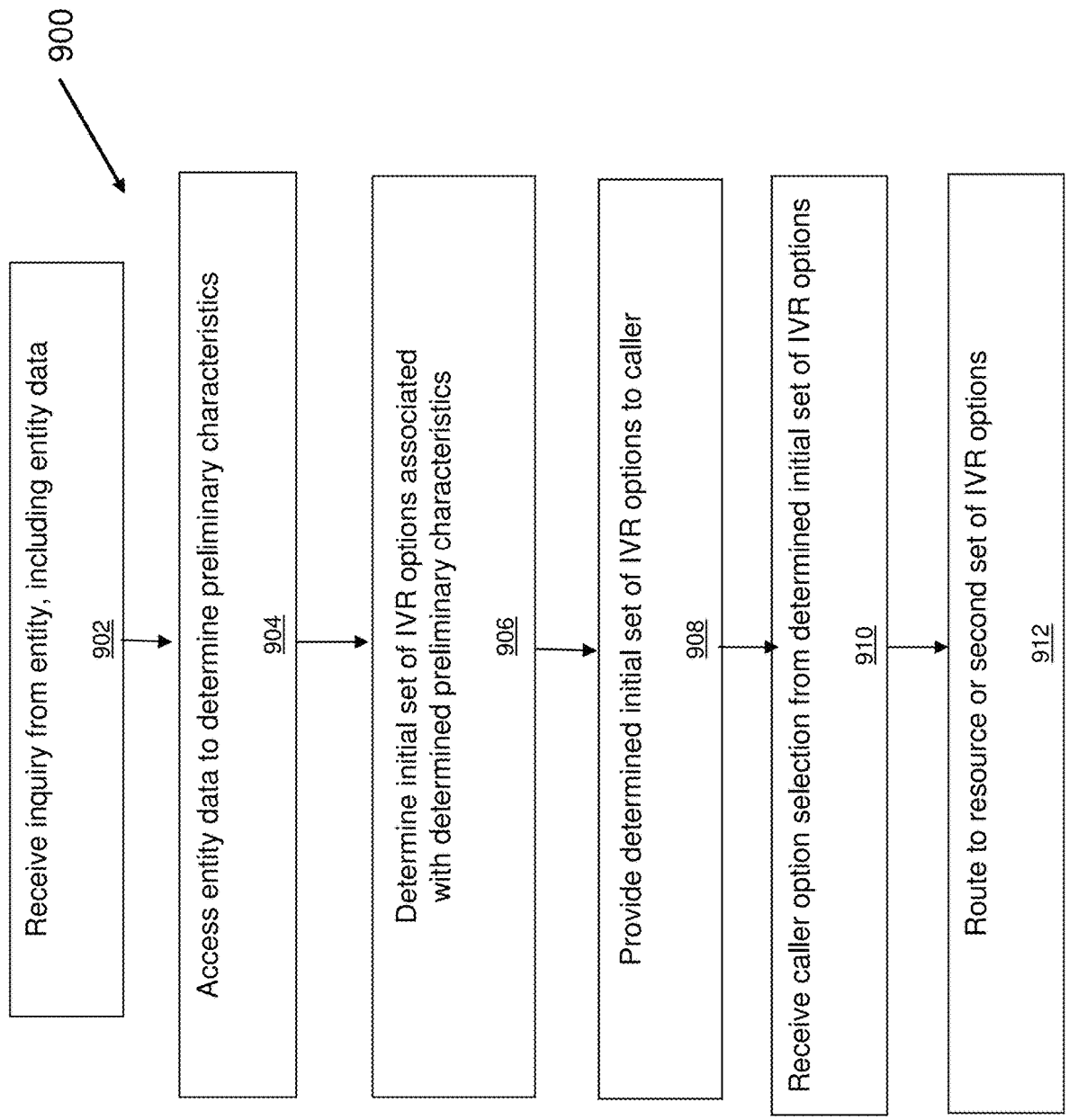
FIG. 9 shows a process flow diagram of another exemplary method of the present invention.

FIG. 9 shows a process flow diagram illustrating another computer implemented method 900 of an embodiment of the present invention. Method 900 begins with receiving entity information with an initiation of an inquiry, step 902. By way of non-limiting example, a telephone call from an employee may carry identifying information such as Caller ID information and originating telephone call information. In other examples, a request for a live chat or a voice over IP call may carry additional data, such as device data, IP address data, and other data. The entity data may be compared to database of subscriber data, such as a database of employees of employers insured by one or more insurance companies. The system may look up the entity data to determine preliminary characteristics of the calling entity, step 904. Preliminary characteristics may include such data as gender, age, occupation, such as workers compensation occupation code, primary language, prior leave history, geographic area such as state, and other preliminary characteristic data. The system may have stored mapping or logic between preliminary characteristic data and initial IVR option selection data. For example, the stored association between a preliminary characteristic of male and initial IVR selection data may include a selection, none of which include pregnancy of the caller as an option. The stored associated between preliminary characteristics of female and age under 40 may be a set of options in which the caller's own pregnancy is a separate choice. A stored association between prior leave of a given volunteer type, such as volunteer firefighter leave, may be an initial option selection including the prior taken leave as a separate option.

The initial set of IVR options associated with the determined preliminary characteristics is determined, step 906. The initial set of IVR options as determined is provided to the caller, step 908. The caller option selection from the determined initial set of IVR options is then received. The caller option selection is processed, and the caller is then routed to a resource associated with the received caller option selection, or a second set of IVR options associated with the caller option selection is presented, step 912. Thereafter, as in other embodiments, the caller is routed to a resource.

Although the methods and features described above with reference to FIGS. 2-9 are described above as performed using the example architecture 200 of FIG. 2 and the example system 300 of FIG. 3, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 2-9 may be used alone without the other features and elements or in various combinations with or without other features and elements. Sub-elements of the methods and features described above with reference to FIGS. 2-9 may be performed in any arbitrary order (including concurrently), in any combination or sub-combination.

The invention claimed is:

1. Improved interactive voice response interface, comprising:
    an interactive voice response platform, the platform having at least one processor configured for communication over a network and one or more memories, the platform comprising telephone infrastructure comprising one or more of call switching equipment and call center automatic call distributors; and
    an interactive voice response application, stored in the one or more memories, having processor executable instructions, which instructions, when executed by the at least one processor, cause the at least one processor to:
        receive an initial communication including one or more of originating number data, IP address data or device data;
        access caller characteristic data corresponding to an entity based solely on the one or more of originating number data, IP address data or device data,
        based on the accessed caller characteristic data and stored logic, determine an initial set of interactive voice response options, wherein the stored logic comprises associations between a plurality of caller characteristic data items and a plurality of initial option sets for prompting to entities, the caller characteristic data items comprising at least prior leave history; and cause the interactive voice response platform to prompt the entity using the determined initial set of interactive voice response options.

2. The improved interactive voice response interface of claim 1, wherein the instructions of the interactive voice response application further cause the at least one processor to:
receive an option selection from the entity from the initial set of interactive voice response options; and
dependent on the received option selection, either provide (a) a predetermined subsequent set of interactive voice response options to be prompted by the interactive voice response platform, wherein the subsequent interactive voice response options include access to at least one combined short term disability and leave management resource and at least one clinical intake nurse resource, the short term disability and leave management resource and the clinical intake nurse resource in communication with at least one insurance claims based subsystem, or (b) route the entity to one of the at least one combined short term disability and leave management resource and at least one clinical intake nurse resource.

3. The improved interactive voice response interface of claim 2, wherein the at least one insurance claims based subsystem is an adjudication system for adjudicating between various disability/leave determinations.

4. The improved interactive voice response interface of claim 1, wherein the associations between a plurality of caller characteristic data items and a plurality of initial option sets for prompting to entities further comprises associations between gender, age, occupation, and primary language and a plurality of initial option sets.

5. The improved interactive voice response interface of claim 1, wherein at least one of the initial set of interactive voice response options determined based on the accessed caller characteristic data and the stored logic provides for a particular medical condition or leave type.

6. The improved interactive voice response interface of claim 1, wherein the initial set of interactive voice response options include an option related to inquiries from a physician's office and an option related to a new claim.

7. The improved interactive voice response interface of claim 6, wherein the option related to inquiries from the physician's office is routed to a combined short term disability and leave management resource for initiating a claim based workflow.

8. The improved interactive voice response interface of claim 6, wherein the option related to a new claim is routed to a combined short term disability and leave management resource if based on a pregnancy.

9. The improved interactive voice response interface of claim 6, wherein the option related to a new claim is routed to a combined short term disability and leave management resource if based on an illness or injury of the entity.

10. The improved interactive voice response interface of claim 1, wherein the initial set of interactive voice response options are provided on a mobile phone app configured to establish an internet protocol based communication with a combined short term disability and leave management resource.

11. An improved interactive voice response method, comprising:
receiving, by an interactive voice response platform, the platform having at least one processor configured for communication over a network and one or more memories, the platform comprising telephone infrastructure comprising one or more of call switching equipment and call center automatic call distributors, an initial communication, including one or more of originating number data, IP address data or device data;
based solely on the one or more of originating number data, IP address data or device data, accessing, by the interactive voice response platform, caller characteristic data corresponding to an entity;
based on the accessed caller characteristic data and stored logic, determining, by the interactive voice response platform, an initial set of interactive voice response options, wherein the stored logic comprises associations between a plurality of caller characteristic data items and a plurality of initial option sets for prompting to entities, the caller characteristic data items comprising at least prior leave history; and
prompting, by the interactive voice response platform, the entity using the determined initial set of interactive voice response options.

12. The improved interactive voice response method of claim 11, further comprising:
receiving an option selection from the entity from the initial set of interactive voice response options; and
dependent on the received option selection, either providing (a) a predetermined subsequent set of interactive voice response options to be prompted by the interactive voice response platform, wherein the subsequent interactive voice response options include access to at least one combined short term disability and leave management resource and at least one clinical intake nurse resource, the short term disability and leave management resource and the clinical intake nurse resource in communication with at least one insurance claims based subsystem, or (b) routing the entity to one of the at least one combined short term disability and leave management resource and at least one clinical intake nurse resource.

13. The improved interactive voice response method of claim 12, wherein the at least one insurance claims based subsystem is an adjudication system for adjudicating between various disability/leave determinations.

14. The improved voice response interface response method of claim 11, wherein the associations between a plurality of caller characteristic data items and a plurality of initial option sets for prompting to entities further comprises associations between gender, age, occupation, and primary language and a plurality of initial option sets.

15. The improved interactive voice response method of claim 11, wherein at least one of the initial set of interactive voice response options determined based on the accessed caller characteristic data and the stored logic provides for a particular medical condition or leave type.

16. An interactive voice response application program product comprising a computer usable non-transitory storage medium storing computer usable program code for interactive voice response prompting, the computer usable program code, when executed by one or more computer processors of an interactive voice response platform comprising telephone infrastructure comprising one or more of call switching equipment and call center automatic call distributors, causing the one or more computer processors to perform the steps of:
receiving an initial communication including one or more of originating number data, IP address data or device data;

accessing caller characteristic data corresponding to an entity based solely on the one or more of originating number data, IP address data or device data, based on the accessed caller characteristic data and stored logic, determining an initial set of interactive voice response options, wherein the stored logic comprises associations between a plurality of caller characteristic data items and a plurality of initial option sets for prompting to entities, the caller characteristic data items comprising at least prior leave history; and causing the interactive voice response platform to prompt the entity using the determined initial set of interactive voice response options.

17. The interactive voice response application program product of claim 16, wherein the computer usable program code, when executed by the one or more computer processors, further causes the one or more computer processors to:

receive an option selection from the entity from the initial set of interactive voice response options; and dependent on the received option selection, either provide (a) a predetermined subsequent set of interactive voice response options to be prompted by the interactive voice response platform, wherein the subsequent interactive voice response options include access to at least one combined short term disability and leave management resource and at least one clinical intake nurse resource, the short term disability and leave management resource and the clinical intake nurse resource in communication with at least one insurance claims based subsystem, or (b) route the entity to one of the at least one combined short term disability and leave management resource and at least one clinical intake nurse resource.

18. The interactive voice response application program product of claim 17, wherein the at least one insurance claims based subsystem is an adjudication system for adjudicating between various disability/leave determinations.

19. The interactive voice response application program product of claim 16, wherein the associations between a plurality of caller characteristic data items and a plurality of initial option sets for prompting to entities further comprises associations between gender, age, occupation, and primary language and a plurality of initial option sets.

20. The interactive voice response application program product of claim 16, wherein at least one of the initial set of interactive voice response options determined based on the accessed caller characteristic data and the stored logic provides for a particular medical condition or leave type.

* * * * *